Patented June 27, 1950

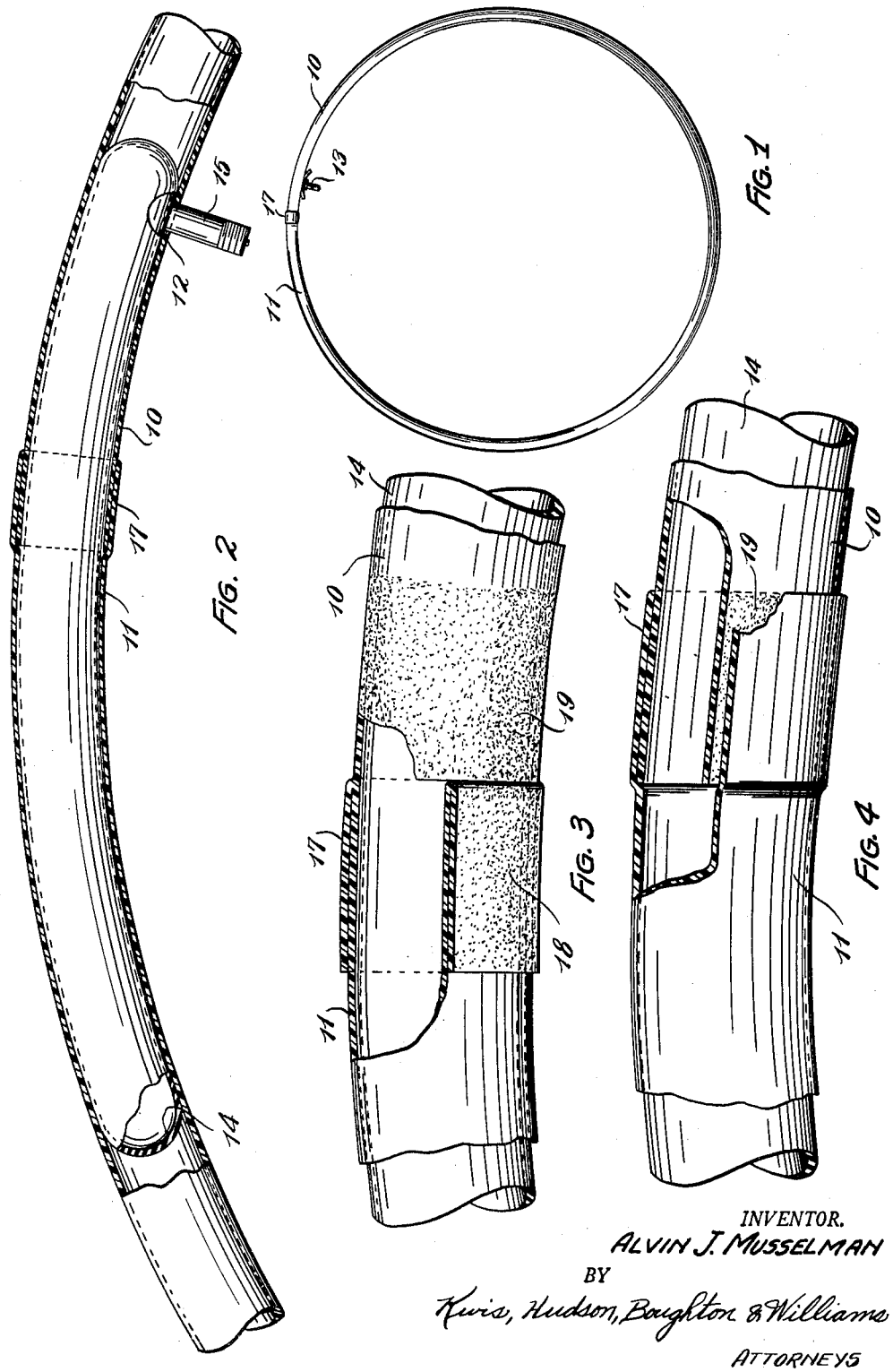

2,512,774

UNITED STATES PATENT OFFICE 2,512,774

METHOD OF MAKING INNER TUBES

Alvin J. Musselman, Santa Barbara, Calif.

Application April 9, 1948, Serial No. 20,142

2 Claims. (Cl. 154—14)

This invention relates to a method of making inner tubes, and has to do more particularly with the splicing of the ends of a length of plastic tubing used in making inner tubes for bicycle tires.

One of the objects of the invention is the provision of a method of splicing the ends of a length of plastic tubing, which shall be economical of time and shall result in a strong and permanent joint.

Other objects and features of novelty will appear as I proceed with the description of that embodiment of the invention which, for the purposes of the present application, I have illustrated in the accompanying drawing, in which Fig. 1 is an elevational view of a completed inner tube formed in accordance with the method of this invention.

Fig. 2 is a fragmental view illustrating an intermediate step in the method of constructing the tube, and Figs. 3 and 4 are fragmental views on a larger scale illustrating other steps in the method.

In the drawing 10 and 11 represent the end portions of a length of extruded plastic tubing cut to the proper length dimension to make an inner tube for a bicycle tire casing of a given standard size. In the end portion 10, a few inches from the extremity thereof, I form a hole 12 approximately one-fourth inch in diameter, which is designed to receive ultimately the valve stem shown at 13 in Fig. 1. I then take a deflated elongated rubber bladder 14, which has a valve stem 15 provided with valve insides of conventional character, and insert one end of the bladder into the end portion 10 of the tubing, causing the valve stem 15 to protrude outwardly through the hole 12 as shown in Fig. 2. The other end of the deflated bladder 14 is then inserted into the end portion 11 of the tubing, and the two end portions are caused to telescope together for about an inch. Next an air pump is attached to the stem 15 and the bladder is inflated sufficiently to put the lapped portions of the tubing under pressure.

Now with the tubing and bladder in the condition of Fig. 2 the operator draws back the overlap 17 on the end portion 11 of the tubing until it just meets the extremity of end portion 10 as illustrated in Fig. 3. He then applies, by means of a brush or otherwise, a coating of rubber cement or other adhesive, indicated at 18 and 19 in the drawing. Preferably this is done with a brush of sufficient width to apply the cement to both areas 18 and 19 at one time. These coatings of course extend all the way around the tubing. The overlap 17 is next turned back to its original position, as in Fig. 4, thereby bringing the two cement coated surfaces together. The cement is then permitted to set under the evenly applied pressure exerted throughout the joint by the inflated bladder 14. A strong and leakproof joint is thus effected.

The final steps of the method comprise the deflation of the bladder 14 and its withdrawal through the hole 12. The plastic material of the tubing does not possess a high degree of elasticity, such as rubber tubing possesses. However, when the bladder 14 is deflated it is easily drawn through the hole 12 without appreciably expanding the hole, and no damage results. The inner tube is then complete except for the attachment of the valve stem 13, which may be accomplished in the conventional manner.

Having thus described my invention, I claim:

1. The method of making an inner tube for a bicycle tire from a length of plastic tubing, which comprises forming a valve opening through the tubing near one end thereof, projecting into that end of the tubing a portion of a deflated elongated bladder having a valve stem, with the said stem protruding through said valve opening, inserting the opposite end of the bladder into the other end of said tubing, cementing the ends of the tubing together in lapped relation with the bladder inflated to cause the cement to set under the pressure exerted by the inflated bladder, deflating the bladder and withdrawing the deflated bladder through said valve opening.

2. The method of making an inner tube for a bicycle tire from a length of plastic tubing, which comprises forming a valve opening through the tubing near one end thereof, projecting into the end of the tubing a portion of a deflated elongated bladder having a valve stem with the said stem protruding through said valve opening, inserting the opposite end of the bladder into the other end of said tubing, causing one end of the tubing to overlap the other end a short distance, inflating the bladder, folding back the overlap, applying cement to the exposed side of the overlap and to the adjacent end of the tubing, turning the overlap back to its original position to bring together the cement coated surfaces, permitting the cement to set under the pressure exerted by the inflated bladder, deflating the bladder and withdrawing the deflated bladder through said valve opening.

ALVIN J. MUSSELMAN.

REFERENCES CITED

The following references are of record in the file of this patent:

UNITED STATES PATENTS

| Number | Name | Date |
|---|---|---|
| 509,097 | Rathbun | Nov. 21, 1893 |
| 529,142 | Shaw | Nov. 13, 1894 |
| 836,772 | Marks | Nov. 27, 1906 |
| 1,311,392 | Harrison | July 29, 1919 |
| 1,402,492 | Grote | Jan. 3, 1922 |
| 1,755,048 | Brice | Apr. 15, 1930 |
| 1,800,462 | Maynard | Apr. 14, 1931 |